US011076275B2

(12) United States Patent
Zhou et al.

(10) Patent No.: US 11,076,275 B2
(45) Date of Patent: Jul. 27, 2021

(54) METHOD AND APPARATUS FOR COMMUNICATION BETWEEN USER EQUIPMENTS

(71) Applicant: Huawei Technologies Co., Ltd., Shenzhen (CN)

(72) Inventors: Han Zhou, Shanghai (CN); Yuan Xia, Beijing (CN); Qi Yao, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/431,469

(22) Filed: Jun. 4, 2019

(65) Prior Publication Data

US 2019/0289447 A1 Sep. 19, 2019

Related U.S. Application Data

(63) Continuation of application No. PCT/CN2016/111932, filed on Dec. 24, 2016.

(51) Int. Cl.
*H04W 4/70* (2018.01)
*H04W 4/46* (2018.01)
(Continued)

(52) U.S. Cl.
CPC ........... *H04W 4/70* (2018.02); *H04L 61/2007* (2013.01); *H04L 61/2061* (2013.01); *H04W 4/46* (2018.02);
(Continued)

(58) Field of Classification Search
CPC ....... H04W 4/70; H04W 76/15; H04W 76/14; H04W 4/46; H04L 61/2061; H04L 61/2007
See application file for complete search history.

(56) References Cited

U.S. PATENT DOCUMENTS 8,085,793 B2 * 12/2011 Krishnan ............... H04W 8/082
370/400
9,450,667 B2 9/2016 Lin et al.
(Continued)

FOREIGN PATENT DOCUMENTS

CN 1525710 A 9/2004
CN 102006337 A 4/2011
(Continued)

OTHER PUBLICATIONS

Lin, X. et al., "An Overview on 3GPP Device-to-Device Proximity Services," IEEE Communications Magazine, vol. 52, Issue 4, Apr. 2014, pp. 40-48.
(Continued)

*Primary Examiner* — Christine Ng
(74) *Attorney, Agent, or Firm* — Slater Matsil, LLP

(57) ABSTRACT

A method and an apparatus for communication between user equipment (UEs) is disclosed. The method comprises: receiving a data packet from a first UE, the data packet including data and an IP address of a second UE; obtaining a context record for the second UE, the context record including the IP address of the second UE and an identifier of a second user plane; sending the data packet to the second user plane according to the identifier of the second user plane in order to enable the second user plane to send the data packet to the second UE.

17 Claims, 5 Drawing Sheets

(51) Int. Cl.
    *H04W 76/12*     (2018.01)
    *H04W 76/11*     (2018.01)
    *H04W 80/04*     (2009.01)
    *H04W 80/10*     (2009.01)
    *H04W 76/15*     (2018.01)
    *H04L 29/12*     (2006.01)
    *H04W 76/14*     (2018.01)

(52) U.S. Cl.
    CPC ............ *H04W 76/11* (2018.02); *H04W 76/12* (2018.02); *H04W 76/14* (2018.02); *H04W 76/15* (2018.02); *H04W 80/04* (2013.01); *H04W 80/10* (2013.01)

(56) References Cited

U.S. PATENT DOCUMENTS

| | | | |
|---|---|---|---|
| 9,979,790 | B1* | 5/2018 | Park ................... H04L 69/18 |
| 2004/0166859 | A1 | 8/2004 | Hayashi et al. |
| 2007/0171875 | A1 | 7/2007 | Suda |
| 2009/0080441 | A1 | 3/2009 | Krishnan et al. |
| 2010/0177674 | A1* | 7/2010 | Aggarwal ............ H04L 45/50 370/312 |
| 2011/0280215 | A1 | 11/2011 | Nakagawa et al. |
| 2011/0299477 | A1* | 12/2011 | Nikander ............ H04W 8/082 370/329 |
| 2012/0099561 | A1* | 4/2012 | Zhao .................. H04W 36/023 370/331 |
| 2012/0185600 | A1 | 7/2012 | Belling et al. |
| 2013/0288668 | A1* | 10/2013 | Pragada ............. H04W 48/18 455/426.1 |
| 2013/0294461 | A1 | 11/2013 | Zhou et al. |
| 2014/0341112 | A1 | 11/2014 | Agiwal et al. |
| 2015/0009915 | A1 | 1/2015 | Baek et al. |
| 2015/0110121 | A1* | 4/2015 | Tan ..................... H04L 45/74 370/401 |
| 2015/0288443 | A1* | 10/2015 | Foxworthy ........ H04L 12/4645 370/316 |
| 2016/0302168 | A1 | 10/2016 | Keller et al. |
| 2018/0181604 | A1* | 6/2018 | Marohn .............. G06F 16/2264 |
| 2019/0098545 | A1* | 3/2019 | Zhang ................ H04W 36/22 |

FOREIGN PATENT DOCUMENTS

| | | |
|---|---|---|
| CN | 102598619 A | 7/2012 |
| CN | 105247947 A | 1/2016 |
| JP | 2002125069 A | 4/2002 |
| JP | 2010088023 A | 4/2010 |
| JP | 2010541312 A | 12/2010 |
| JP | 2011239272 A | 11/2011 |
| WO | 2005081428 A1 | 9/2005 |

OTHER PUBLICATIONS

3rd Generation Partnership Project; Technical Specification Group Services and System Aspects; Architecture enhancements for control and user plane separation of EPC nodes; Stage 2 (Release 14), 3GPP TS 23.214 v14.1.0 (Dec. 2016), 71 pages.

3rd Generation Partnership Project;Technical Specification Group Core Network and Terminals; General Packet Radio System (GPRS) Tunnelling Protocol User Plane (GTPv1-U) (Release 9), 3GPP TS 29.281 V9.3.0 (Jun. 2010), 24 pages.

3rd Generation Partnership Project; Technical Specification Group Services and System Aspects; Study on control and user plane separation of EPC nodes (Release 14), 3GPP TR 23.714 V14.0.0 (Jun. 2016), 87 pages.

3rd Generation Partnership Project; Technical Specification Group Services and System Aspects; Study on Architecture for Next Generation System (Release 14), 3GPP TR 23.799 V1.2.1 (Nov. 2016), 526 pages.

Huawei et al., "Local MBMS related MBMS data delivery," 3GPP TSG-CT WG3 Meeting #86-BIS, C3-164104, Reno, NV, USA, Nov. 14-18, 2016, 10 pages.

Mediatek Inc., "Flexible UP architecture for NR access technology," 3GPP TSG RAN2#93bis, R2-162502, Dubrovnik, Croatia, Apr. 11-15, 2016, 6 pages.

Huawei et al., "Clarification on relation between flexible UP-traffic protection and slicing/heterogeneous access network," 3GPP TSG SA WG3 (Security) Adhoc Meeting on FS_NSA, S3-161334, San Diego, CA, USA, Sep. 27-29, 2016, 4 pages.

3rd Generation Partnership Project; Technical Specification Group Core Network and Terminals; Interface between the control Plane and the User Plane of EPC Nodes; Stage 3 (Release 14), 3GPP TS 29244 V03.0 (Nov. 2016), 47 pages.

* cited by examiner

METHOD AND APPARATUS FOR COMMUNICATION BETWEEN USER EQUIPMENTS

CROSS-REFERENCE TO RELATED APPLICATIONS

This application is a continuation of International Application No. PCT/CN2016/111932, filed on Dec. 24, 2016, the disclosure of which is hereby incorporated by reference in its entirety.

TECHNICAL FIELD

The embodiments of the present invention relate to the field of mobile communication technologies, and in particular, to a method and a system for implementing device-to-device (D2D) communication in a cellular communication network.

BACKGROUND

One of the development goals of mobile communications is to establish an extensive network including various types of terminals. This is also currently one of the starting points of developing the Internet of Things in a cellular communication framework. According to a prediction of the industry, in 2020, there will be approximately 50 billion cellular access terminals worldwide, and most of them will be machine communication terminals having a characteristic of the Internet of Things. The Internet of Vehicles is an extension of the Internet of Things in the transportation field. The Internet of Vehicles is a unified network in which information about vehicles, roads, and environments is collected using technologies such as wireless communications, sensing, and probing, information is exchanged and shared between vehicle-to-vehicle (V2V), and intelligent coordination and cooperation are implemented between a vehicle-to-infrastructure (V2I) to implement intelligent traffic management and control, intelligent vehicle control, and an intelligent dynamic information service. As aided driving and automatic driving technologies gradually mature, higher requirements are imposed on the reliability and a low latency of the Internet of Vehicles. An Internet of Vehicles communication technology including V2V, V2I, Vehicle-to-Pedestrian (V2P), and the like is becoming a new highlight of the Internet of Vehicles, and is a key technology of a future intelligent transportation system. The Internet of Vehicles provides for communication between vehicles, between a vehicle and a base station, and between base stations. This can be used, for example, to obtain a series of traffic information, such as live traffic, road information, and pedestrian information, to improve traffic safety and to reduce a traffic accident rate.

In an Evolved Packet Core (EPC) network architecture, a Serving Gateway (S-GW) and a Packet Data Network (PDN) Gateway (P-GW) are mainly responsible for forwarding user plane data, but also reserve a capability of processing a large amount of interface signaling. The S-GW and the P-GW may be combined into one network element, and collectively referred to as a gateway. As the network architecture evolves, to enable an application and a content source to be closer to a user, to cooperate with a distributed deployment of the content source, to further reduce an end-to-end service latency, and to meet requirements of some low-latency applications and local voice, the gateway is deployed gradually closer to the user. Complex control logic of the gateway is separated out, and a logic control function is reserved on a centralized conventional gateway or is integrated into an integrated control plane, so that the gateway is divided into two types of gateways, one is called "control plane" (CP) and the other one is called "user plane" (UP). The UP is also known as the data plane, forwarding plane, carrier plane or bearer plane. The control plane carries signaling traffic and is responsible for routing; the user plane carries the network user data traffic. Therefore, cost pressure caused by the distributed deployment can be effectively reduced. After separation, the user plane and the control plane support independent scaling, further improving elasticity and flexibility of the network architecture. Centralized control logic makes it easier to customize a network slice and to serve diversified industry applications.

In an EPC network architecture, an Internet Protocol (IP) address of user equipment (UE) is bound to a UP, and the UP is an anchor of a service. When UP switching occurs, the IP address of the UE is changed. Therefore, a service of the UE is interrupted, and service continuity cannot be maintained.

In an existing V2V communication scenario, a D2D communication manner is mainly used. During D2D communication, a distance is relatively short, and channel quality is relatively good. Therefore, a high transmission rate, a low latency, and low power consumption can be implemented. Before the D2D technology was developed, a similar communication technology, such as Bluetooth or WiFi Direct, already existed. Due to various reasons, these two technologies failed to be commercially utilized extensively. Compared with another direct communication technology that does not depend on an infrastructure network design, the D2D technology is more flexible. For example, D2D can be used for establishing a connection and performing resource allocation under the control of a base station, as well as performing information exchange without network infrastructure.

In an existing V2V communication scenario, a D2D manner is mainly used. That is, vehicle to vehicle communication is looped back at one or more base stations controlled by a same UP, and does not pass a core network. D2D aims to enable user equipment within a particular distance range of each other to directly communicate. The UP controls a D2D connection, and the UP obtains all link information according to measurement information reported by a terminal. In the example shown in FIG. 1, UE 1 and UE 2 are vehicles controlled by a base station, and exchange data using a D2D link. As vehicles move fast, and a UP network is deployed closer to UEs, a cross-UP communication scenario easily appears. Cross-UP means that multiple UEs are served by multiple UPs. Because the existing D2D communications technology is restricted to communication in the base station or a UP loopback, UE1 and UE2 will not be able to communicate normally in the cross-UP communication scenario or to maintain continuous service when UE1 or UE2 switches from one UP to another UP.

SUMMARY

To resolve the technical problems, embodiments of the present invention provide a method for communication between UEs and a gateway and a system for communication between UEs. Technical solutions of the present invention are as follows.

One embodiment provides a method for communication between user equipment (UE). The method includes receiving, by a first user plane, a data packet from a first UE, the data packet including data and an IP address of a second UE.

The method also includes obtaining, by the first user plane, a context record for the second UE, the context record including the IP address of the second UE and an identifier of a second user plane. The method also includes sending, by the first user plane, the data packet to the second user plane according to the identifier of the second user plane in order to enable the second user plane to send the data packet to the second UE. The IP address of the second UE included in the context record identifies that context record as relating to the second UE, and thus distinguishes the respective context record from context records of other UEs.

In an embodiment, before obtaining, by the first user plane, a context record for the second UE, the context record for the second UE has been created and stored on the first user plane. Thus, the first user plane can directly obtain the context record for the second UE with much less time compared to the following situation where the context record for the second UE is not available on the first user plane. In this way, timely D2D communication and less latency time are achieved.

When the context record for the second UE is not available on the first user plane, obtaining the context record for the second UE may comprise: sending, by the first user plane, a request to a control plane for the context record for the second UE, and receiving, by the first user plane, the context record for the second UE from the control plane. The method may then further comprise storing the context record on the first user plane. The context record can thus be made available on the first user plane for future use, e.g., for a case in which the first user plane receives a further data packet that is addressed to the second UE. Thus, timely D2D communication and less latency are achieved.

Another embodiment provides a system for communication between user equipments (UEs), the system comprising a first user plane and a second user plane. The first user plane is configured to: receive a data packet from a first UE, the data packet including data and an IP address of a second UE; obtain a context record for the second UE, the context record including the IP address of the second UE and an identifier of the second user plane; send the data packet to the second user plane according to the identifier of the second user plane. The second user plane is configured to send the data packet to the second UE.

In an embodiment, when the second UE switches to a third user plane, the method comprises obtaining a critical distance and further comprises for each user plane in a set of one or more user planes: if a distance from the respective user plane to the second UE is less than the critical distance, then if a context record for the second UE has been stored in the respective user plane, updating, by a control plane, this context record for the second UE; and if no context record for the second UE has been stored in the respective user plane, creating, by the control plane, a context record for the second UE in the respective user plane; each of the thus updated or created context records for the second UE including the IP address of the second UE and an identifier of the third user plane.

Further, another embodiment provides a gateway for communication between user equipment (UEs). The gateway includes a receiver, configured to receive a data packet from a first UE, the data packet including data and an IP address of a second UE. The gateway also includes a processor, configured to obtain a context record for the second UE, the context record including the IP address of the second UE and an identifier of another gateway; a transmitter, configured to send the data packet to the other gateway according to the identifier of the other gateway in order to enable the other gateway to send the data packet to the second UE.

When the second UE switches from the other gateway to a third gateway, the context record for the second UE is updated, the updated context for the second UE including the IP address of the second UE and an identifier of the third gateway.

By using the solutions provided in the method, system and gateway of different embodiments, different UEs (e.g., vehicles) controlled by a UP and a CP can exchange data using a D2D link. When a cross-UP communication scenario appears, UEs will still be able to communicate normally and maintain service continuity.

DETAILED DESCRIPTION OF ILLUSTRATIVE EMBODIMENTS

The embodiments of the present invention are mainly related to communication between moving UEs. The UEs may be fast moving vehicles, unmanned aircraft and other moving equipment. Rapid movement of UE easily causes switching of a local anchor. Even though UEs in a motorcade communicate over one UP in most cases, cross-UP communication also occurs between UEs.

Figure 1:
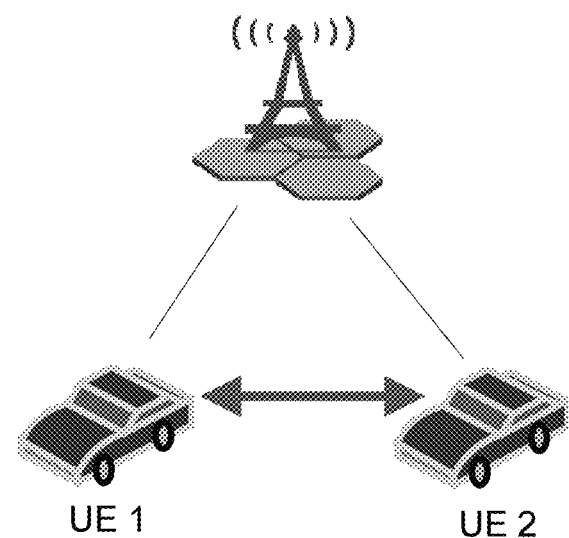
FIG. 1 schematically shows an example of a communication system.
Figure 2:
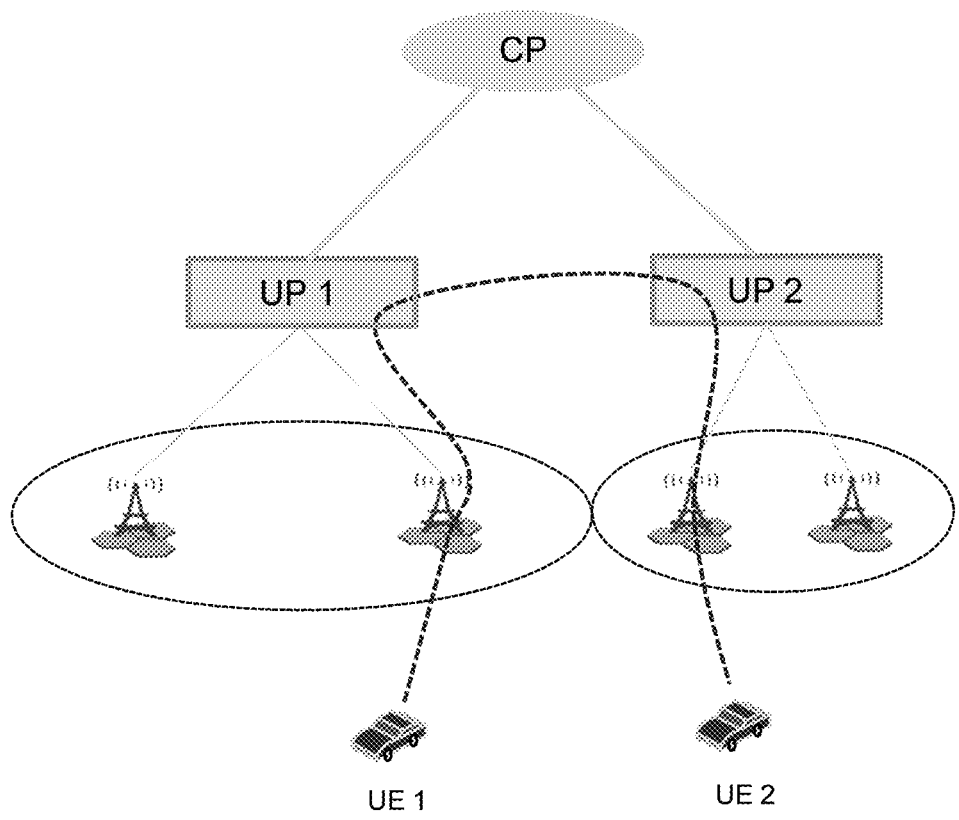
FIG. 2 schematically shows an example of a communication system of the present invention.

A system architecture is shown in FIG. 2. The system architecture comprises a CP, multiple UPs and multiple base stations. The CP can serve and manage the multiple UPs. Each UP can serve and manage one or more base stations. Via one or more base stations, multiple UPs and the CP, different UEs can communicate with each other.

Particular address pool resources are allocated in advance, such as 192.168.0.2 to 192.168.0.254 and 172.146.1.2 to 172.146.1.254, to a UE performing a V2V service. These particular address pool resources are enabled on each UP and each UP can process data packets with these address segments.

UPs form a mesh network. The UPs may perform tunnel communication at a device granularity. For example, a data packet between UEs may be transmitted via a tunnel between different UPs, using an IP in IP protocol. Because the service is looped back in the UPs, the UPs do not need to broadcast routes of these address segments to the outside.

When a UE accesses a network, a CP selects N user plane gateways for the UE (e.g., according to a physical location of the UE), and creates a context record for the UE on each of the N selected UP gateways (wherein N is a natural number greater or equal 1). The context record comprises an IP address of the UE and address information of a base station to which the UE is connected. The address information of a base station may include an IP address of the base station and a tunnel endpoint identifier (TEID) related to the base station.

The context record on a UP currently serving the UE may be marked as a "master" context record. Context records for the UE on the other N−1 user planes may be marked as "slave" context records. Each of the slave context records comprises the IP address of the UE and the identifier of the UP that is currently serving the UE. The identifier of the UP may include an IP address of the UP and a tunnel endpoint identifier (TEID) related to the UP. In this embodiment and the following embodiments, the "master" or "slave" in context record is only a mark and is not a necessary field.

Here is a typical and main scenario for communication between two different UEs (See FIG. 2). Assume that there are two UEs (UE1 and UE2) that need to perform a V2V service and that UE1 wants to send a data packet to UE2 (voluntarily or upon a request from UE2 or a CP). UP1 and UP2 are controlled by the CP. UE1 is being served by UP1 and UE2 is being served by UP2. The main steps are as follows.

1. When UE1 accesses a network and is served by UP1 of that network, a context record for UE1 is created and stored in the memory of UP1. Similarly, when UE2 accesses a network and is served by UP2, a context record for UE2 is created and stored in the memory of UP2 of that network. As UE1 is being served by UP1 and UE2 is being served by UP2, the context record for UE1 on UP1 may be marked "master". Similarly, the context record for UE2 on UP2 may be marked "master". A slave context record is created for UE1 respectively on each UP of a set of other UPs (where "other" means other than UP1). That set of other UPs may, for example, comprise or consist of those other UPs that are located less than a critical distance (e.g., 5 km) away from UE1. Similarly, a slave context record is created for UE2 respectively on each UP of a set of other UPs (where "other" means other than UP2). That set of other UPs may, for example, comprise or consist of those other UPs that are located less than the critical distance (e.g., 5 km) away from UE2.

2. UP1 receives a data packet from UE1. The data packet includes data and an IP address of UE2.

UE1 may voluntarily send data packets to UE2. For example, UE1 may periodically broadcast UE1's physical location to other UEs. UE1 sends the data packets to UP1 via a base station to which UE1 is currently connected. The base station is connected to UP1 and controlled by UP1.

3. UP1 obtains a context record for UE2 which includes the IP address of UE2 and an identifier of UP2.

For instance, by means of searching the memory located in UP1 according to the IP address of UE2 included in the data packet, UP1 finds a slave context record for UE2 which includes the same IP address as the IP address of UE2 included in the data packet. Further, the slave context record for UE2 includes an identifier of UP2 and the identifier of UP2 may include an IP address of UP2 and a tunnel endpoint identifier (TEID) related to UP2.

When the distance between UP1 and UE2 is greater than a critical distance, the slave context record for UE2 may have been not created on UP1 and may therefore be not available on UP1. In this case, or whenever the context record for UE2 is not available on UP1, UP1 will send a request including an IP address of UE2 to the CP for the context record for UE2 and subsequently receive the context record for UE2 from the CP.

4. UP1 sends the data packet to UP2 according to the identifier of UP2.

After obtaining the context record for UE2, UP1 will send the data packet to UP2 according to the identifier of UP2 recorded in the context record for UE2.

The UPs form a mesh network, and they may perform tunnel communication. The data packet sent by UP1 is transmitted to UP2 via these tunnels using an IP in IP protocol.

5. UP2 sends the data packet to UE2.

The master context record for UE2 may include the IP address of UE2 and address information of a base station to which UE2 is currently connected. The address information of the base station may include an IP address of the base station and a tunnel endpoint identifier (TEID) related to the base station. Using the address information of the base station, UP2 can find the base station and send data packets to the base station, and then the base station forwards the data packets to UE2.

Optionally, the master context record for UE2 may include the IP address of UE2 and the identifier of UP2, and the address information of the base station to which UE2 is currently connected is not stored in the master context record, but stored in other locations of UP2's memory so that UP2 can find it. If so, when UE2 switches frequently between different base stations being served by UP2, the master context record does not need to be updated accordingly.

When UP2 receives the data packet, UP2 will separate out an outer IP address and find the IP address of UE2 of an inner data packet (e.g., in accordance with the IP in IP protocol). UP2 then searches a memory of UP2 and finds the master context record for UE2 on UP2 according to the IP address of UE2 of the inner data packet. UP2 then sends the data packet to UE2 via a base station whose address information is carried in the master context record or other locations.

To facilitate understanding about the embodiments of the present invention, several specific embodiments are used as examples to make further description with reference to the accompanying drawings, and the embodiments are not intended to limit the embodiments of the present invention.

Embodiment 1

Figure 3:
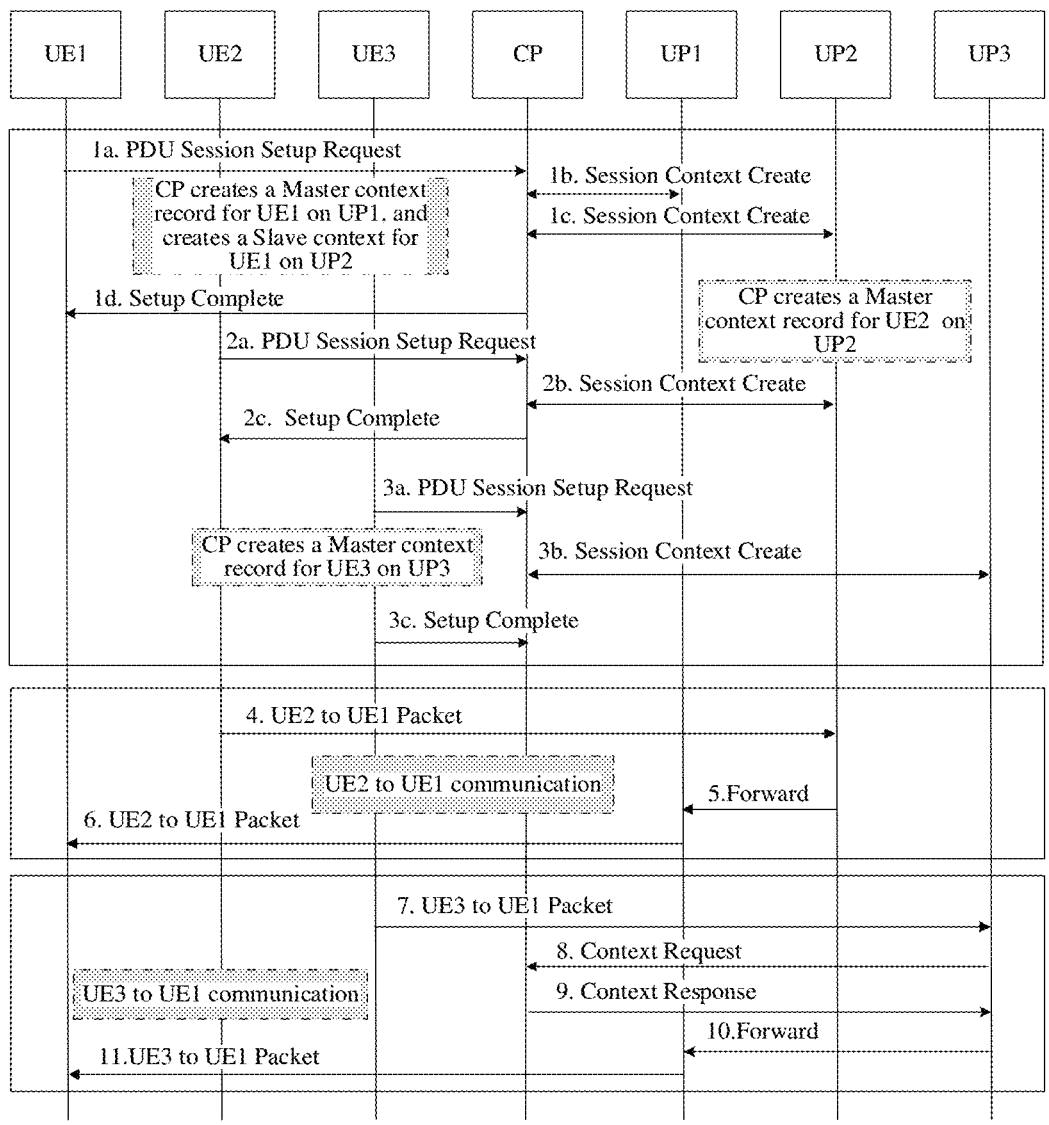
FIG. 3 is a flowchart which schematically illustrates one embodiment of the present invention.

A specific scenario to which this embodiment is applied is that vehicles are performing a V2V service communication, but UP switching does not occur. Referring to FIG. 3, UE1, UE2, and UE3 are terminals of a V2V service type. In this embodiment, no UP switching occurs on any UE in a communication process. The communication process mainly includes the following. UE2 and UE3 each send data packets to UE1. UE1 is served by UP1, UE2 is served by UP2, and UE3 is served by UP3. As UE1 is being served by UP1, the context record for UE1 on UP1 may be marked "master". UE1, UE2 and UE3 are not limited to terminals of a V2V service type; instead they may be other moving terminals suitable for D2D communication. A specific implementation procedure is as follows (as shown in FIG. 3):

1a. A Packet Data Unit (PDU) session setup request is sent from UE1 to the CP. The CP learns, according to subscription data of UE1, that UE1 is a UE of a V2V type, and the CP selects a gateway UP1 that is serving UE1, and selects, according to a policy, a gateway (e.g., UP2) in a coverage area that is centered approximately on the location of UE1 and that has, for example, a semi-diameter of 5 KM.

1b. The CP creates a session context record for UE1 on UP1, and sets a state of the context record to a Master context record. The Master context record for UE1 includes an IP address of UE1 and address information of a base station to which UE1 is connected.

1c. The CP also creates a session context record for UE1 on UP2, and sets a state of the context record to a Slave context record, where an IP address of UE1 and an identifier of UP1 are stored in the Slave context record. The identifier of UP1 may include an IP address of UP1 and a tunnel endpoint identifier (TEID) related to UP1.

1d. The CP sends a setup complete response to UE1 and a PDU session is established between UE1 and UP1.

2a-2c. A PDU session setup request is sent from UE2 to the CP. The CP learns, according to subscription data of UE2, that UE2 is a UE of the V2V type. The CP selects UP2 serving UE2, and the CP creates a session context record for UE2 on UP2, and sets a state of the context record to a Master context record. The CP sends a setup complete response to UE2 and a PDU session is established between UE2 and UP2.

3a-3c. A PDU session setup request is sent from UE3 to the CP. The CP learns, according to subscription data of UE3, that UE3 is UE of the V2V type. The CP selects UP3 serving UE3 and creates a session context record for UE3 on UP3, and sets a state of the context record to a Master context record. The CP sends a setup complete response to UE3 and a PDU session is established between UE3 and UP3.

4. UE2 sends a data packet to UP2. Specifically, the data packet carries a Source IP (Sr-IP) address and a Destination IP (Dst-IP) address. The Sr-IP address is the IP address of UE2, and the Dst-IP address is the IP address of UE1.

5. UP2 forwards the data packet to UP1. Specifically, when UP2 determines, according to Dst-IP, that the data packet belongs to an IP pool of a V2V service, UP2 searches and finds the Slave context record for UE1 according to the Dst-IP address, where the Slave context record for UE1 records an IP address of UE1 and the identifier of UP1. UP2 then forwards the data packet to UP1 according to the identifier of UP1. The UPs perform tunnel communication, an IP header is encapsulated outside an original IP header, the encapsulation is performed on UP2, and decapsulation is performed on UP1.

6. After UP1 receives the data packet forwarded by UP2, UP1 separates out an outer IP, finds the Master context record of UE1 according to the Dst-IP address of an inner data packet, and sends the data packet to UE1 via the base station whose address information is included in the Master context record.

7. UE3 sends a data packet to UP3, and UP3 sends the data packet to UE1, where the data packet carries a Sr-IP address and a Dst-IP address. The Sr-IP address is the IP address of UE3. The Dst-IP address is the IP address of UE1.

8. UP3 determines, according to the Dst-IP address, that the data packet belongs to the IP pool of the V2V service, but UP3 does not have a context record for UE1. Therefore, UP3 requests a context record for UE1 from the CP.

9. The CP delivers a context record for UE1 to UP3, and sets a state of the context record to a Slave context record, where the IP address of UE1 and the identifier of UP1 is stored in the Slave context record as mentioned in step 1c.

10. UP3 forwards the data packet to UP1. UP3 obtains, according to the Slave context record of UE1, the identifier of UP1 currently serving UE1, and forwards the data packet to UP1.

11. After UP1 receives the data packet forwarded by UP3, UP1 separates out an outer IP address, finds the Master context record for UE1 on UP1 according to the Dst-IP address of an inner data packet, and sends the data packet to UE1 according to the Master context record.

Embodiment 2

Figure 4:
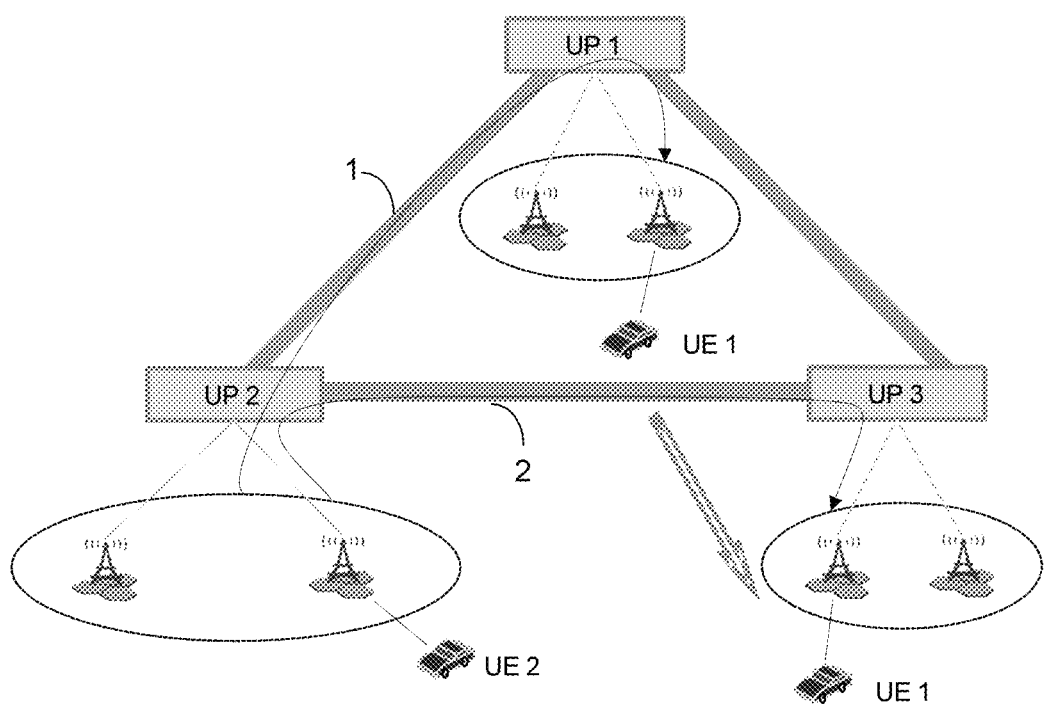
FIG. 4 schematically shows another embodiment of the present invention.
Figure 5:
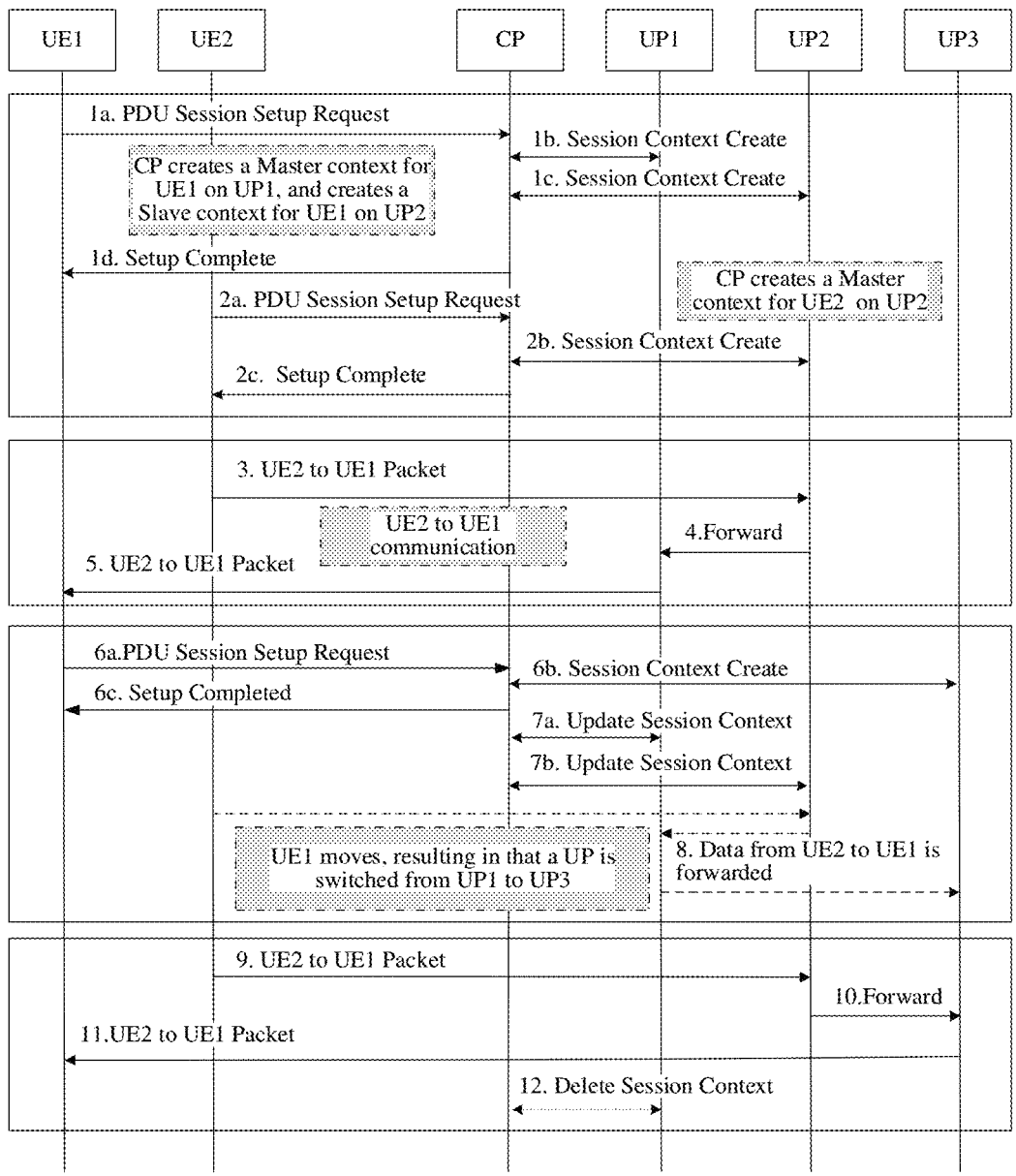
FIG. 5 is a flowchart which schematically illustrates another embodiment of the present invention.

Another specific scenario to which this embodiment can be applied is that in a process of communication between vehicles, service continuity is maintained even when movement of a vehicle causes a change of a user plane gateway serving a UE. As illustrated in FIG. 4, both UE1 and UE2 are terminals of a V2V service type and UE2 sends data packets to UE1. As UE1 is being served by UP1, the context record for UE1 created on UP1 may be marked "master". Because of movement of UE1, the user plane gateway serving UE1 is switched from UP1 to UP3. The path of transmitting data packets has changed from path 1 to path 2. UE1 and UE2 are not limited to terminals of a V2V service type. Instead, they may be other moving terminals capable of D2D communication. A specific implementation procedure is as follows (as shown in FIG. 5).

1a-1c and 2a-2c. The steps are the same as the steps 1a-1c and 2a-2c in embodiment 1.

3. UE2 sends a data packet to UP2. Specifically, the data packet carries a Sr-IP address and a Dst-IP address. The Sr-IP address is the IP address of UE2, and the Dst-IP address is the IP address of UE1.

4. UP2 forwards the data packet to UP1. Specifically, when UP2 determines, according to the Dst-IP address, that the data packet belongs to an IP pool of a V2V service, UP2 searches and finds the Slave context record for UE1 according to the Dst-IP address. The Slave context record for UE1 includes an IP address of UE1 and the identifier of UP1. UP2 then forwards the data packet to UP1 according to the identifier of UP1. The UPs perform tunnel communication, wherein an IP header is encapsulated outside an original IP header. The encapsulation is performed on UP2, and decapsulation is performed on UP1.

5. After UP1 receives the data packet forwarded by UP2, UP1 separates out an outer IP address, finds the Master context record of UE1 according to the Dst-IP address of an inner data packet, and will send the data packet to UE1 via the base station whose address information is included in the Master context record.

6a-6c. Because UE1 moves to UP3 and UP3 begins to serve UE1, the CP creates a session context record for UE1 on UP3, and sets a state of the context record to a Master context record. The CP detects that UE1 is capable of D2D communication and does therefore not allocate a new IP address to UE1. Thus, the IP address of UE1 will not change when UE1 switches to UP3. If UP3 previously had a slave context record for UE1, then the slave context record will be updated. The created or updated context record is marked "master" and includes the IP address of UE1 and address information of a base station to which UE1 is connected.

7a. The CP sends an updated Session context record for UE1 to UP1, to update context record on UP1. The updated context record is marked "Slave" and includes the IP address of UE1 and an identifier of UP3. The identifier of UP3 includes the IP address of UP1 and a tunnel endpoint identifier (TEID) related to UP1.

7b. The CP sends the updated Session context record for UE1 to UP2, to update context record on UP2. The updated context record is marked "Slave" and includes the IP address of UE1 and the identifier of UP3.

8. Optionally, during the switching of UE1 from UP1 to UP3, it may happen that one or more data packets cannot be sent to UE1 via UP1. In such a case these data packets will be buffered on UP1, the last data packet is set to an End marker flag bit, and UP1 forwards, to UP3 by using a tunnel between UP1 and UP3, all data packets before the End marker that have not been sent to UE1. The IP address of each of the UEs in this and in other embodiments is allocated by the CP. For example, the CP can select an IP address from an address pool resource which is used for D2D communication, and allocate that IP address to UE1. When UE1 switches from UP1 to UP3, the CP can recognize UE1 as a D2D device by its IP address and will therefore not allocate a new IP address to UE1. Thus the buffered data packets on UP1 with the IP address of UE1 can still be forwarded to UE1 via UP3. Otherwise (that is, if the IP address of UE1 changes, e.g., if UE1 is not a D2D device or for some other reason), the buffered data packets with the IP address of UE1 will not be forwarded to UE1 via UP3.

9-11. A subsequent data packet is transmitted using a tunnel between UP2 and UP3. Specifically, UE2 sends a subsequent data packet to UE1, where the subsequent data packet also carries a Sr-IP address and a Dst-IP address, the Sr-IP address being the IP address of UE2, and the Dst-IP address being the IP address of the UE1. UP2 searches and finds the Slave context record (7b) for UE1 according to the Dst-IP address, determines from that context record that UP3 is serving UE1, and forwards the subsequent data packet to UP3. After UP3 receives the data packets forwarded by UP1 and the subsequent data packet forwarded by UP2, UP3 separates out an outer IP address, finds the Master context record for UE1 according to the Dst-IP address, and sends the data packets to UE1 according to the Master context record. UP3 sends, to UE1 in sequence, the data packets before the End marker that have not been sent to UE1, and then sends a subsequently received data packet to UE1.

12. Because the location of UE1 moves, after the data forwarding is completed, if UP1 is far away from UE1, the context record for UE1 on UP1 may be deleted.

The foregoing description is a detailed description of the method for communication between UEs according to embodiments of the present invention with reference to FIG. 2 to FIG. 5. The following describes a system and an apparatus for communication between UEs according to embodiments of the present invention with reference to FIG. 6 to FIG. 7.

Figure 6:
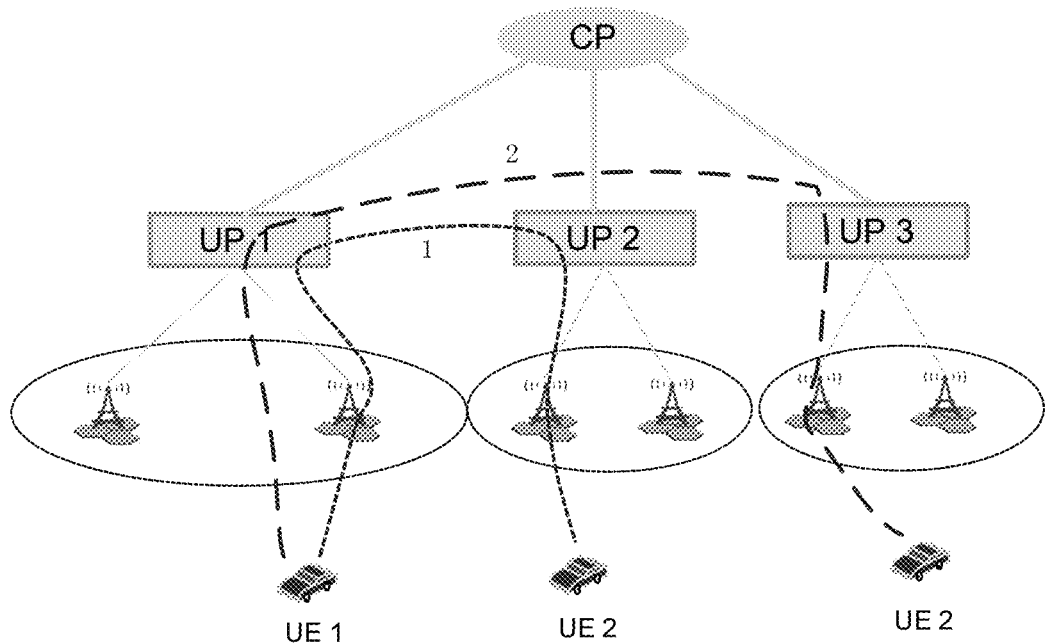
FIG. 6 schematically shows an example of a communication system.

FIG. 6 schematically shows a communication system comprising user planes UP1 and UP2, and user equipments UE1 and UE2. UP1 is configured to receive a data packet from UE1, the data packet including data and an IP address of UE2; obtain a context record for UE2, the context record including the IP address of UE2 and an identifier of UP2; and send the data packet to UP2 according to the identifier of UP2. UP2 is configured to send the data packet to UE2.

For example, UP1 may be configured to obtain the context for UE2 from UP1 when the context record for UE2 has been stored on UP1.

The system further includes a CP. When the context record for UE2 is not available, for obtaining the context record for UE2, UP1 is configured to send a request to the CP for the context record for UE2, and receive the context record for UE2 from the CP.

In the example, the system further includes UP3, and when UE2 switches from UP1 to UP3, the CP is configured to update the context for UE2 in UP1, the updated context for UE2 including the IP address of UE2 and an identifier of UP3; UP1 is configured to receive a subsequent data packet from UE1, wherein the subsequent data packet includes data and the IP address of UE2; send the subsequent data packet to UP3 according to the identifier of UP3; and UP3 is configured to send the subsequent data packet to UE2.

When UE2 switches to UP3, the CP is configured to obtain a critical distance and for each user plane in a set of one or more user planes of the system, if a distance from the respective user plane to the second UE is less than a critical distance, the CP is configured to update a context record for UE2 if a context record for UE2 has been stored in the respective user plane; and create a context record for UE2 in the respective user plane if no context record for UE2 has been stored in the respective user plane; the updated or created context record for UE2 including the IP address of UE2 and an identifier of UP3.

Figure 7:
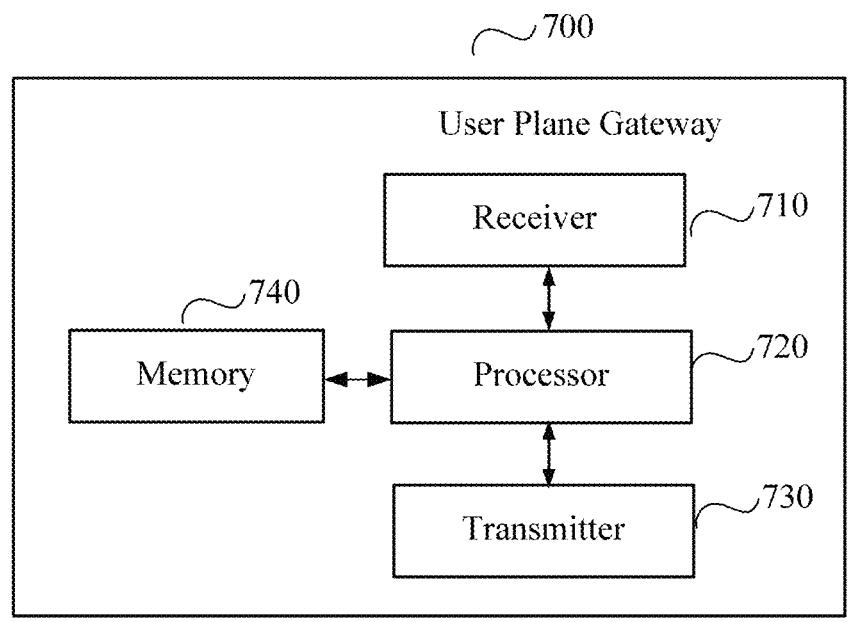
FIG. 7 schematically shows an example of a user plane gateway.

FIG. 7 is a schematic block diagram of a user plane gateway 700. The UP gateway 700 comprises: a receiver 710, configured to receive a data packet from UE1, the data packet including data and an IP address of UE2; a processor 720, configured to obtain a context record for UE2, the context record including the IP address of UE2 and an identifier of another gateway; a transmitter 730, configured to send the data packet to the other gateway according to the identifier of the other gateway in order to enable the other gateway to send the data packet to UE2.

The context record for UE2 may have been stored in a memory 740 of the gateway 700. However, when the processor 720 determines that the context record for UE2 is not available in the memory 740, the transmitter 730 is configured to send a request to a control plane for the context for UE2, and the receiver 710 is configured to receive the context record for UE2 from the control plane and to store it in the memory 740 for future use.

When UE2 switches from the other gateway to a third gateway, the context record for UE2 (in the memory 740) is updated. The updated context for UE2 includes the IP address of UE2 and an identifier of the third gateway.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the principle of the present invention shall fall within the protection scope of the present invention.

What is claimed is:

1. A method, comprising:
 receiving, by a first user plane device, a first data packet to be sent to a second user equipment (UE) from a first user equipment (UE), the first data packet including first data and an Internet Protocol (IP) address of the second UE;
 obtaining, by the first user plane device, an identifier of a second user plane device associated with the IP address of the second UE from a context record, wherein the second user plane device serves the second UE, and the context record is stored by the first user plane device before the first data packet is received;
 sending, by the first user plane device, the first data packet to the second user plane device according to the identifier of the second user plane device, wherein sending the first data packet to the second user plane device causes the second user plane device to send the first data packet to the second UE;

receiving, by the first user plane device, an updated session context record from a control plane device when the second UE switches to a third user plane device that serves the second UE after the switch;

updating, by the first user plane device, the identifier of the second user plane device associated with the IP address of the second UE in the context record with an identifier of the third user plane device according to the updated session context record;

receiving, by the first user plane device, a second data packet to be sent to the second UE from the first UE, wherein the second data packet includes the IP address of the second UE, and the IP address of the second UE remains unchanged when the second UE switches from the second user plane device to the third user plane device; and sending, by the first user plane device, the second data packet to the third user plane device according to the identifier of the third user plane device included in the context record.

2. The method of claim 1, further comprising:

in response to the second UE switching from the second user plane device to the third user plane device, obtaining a critical distance, and for each user plane device in a set of one or more user plane devices, performing the following:

when a distance from the respective user plane device to the second UE is less than the critical distance, and when a context record has been stored in the respective user plane device, updating, by the control plane device, the context record stored in the respective user plane device, wherein the updated context record stored in the respective user plane device includes the IP address of the second UE and the identifier of the third user plane device; and when no context record for the second UE has been stored in the respective user plane device, creating, by the control plane device, a context record in the respective user plane device, wherein the created context record for the second UE includes the IP address of the second UE and the identifier of the third user plane device.

3. The method of claim 2, further comprising:

for each user plane device in the set of one or more user plane devices, when the distance from the respective user plane device to the second UE is greater than the critical distance, and a context record has been stored in the respective user plane device, deleting, by the control plane device, the context record in the respective user plane device.

4. The method of claim 1, wherein the IP address of the second UE and an IP address of the first UE are allocated from an address pool resource, and IP addresses of the address pool resource are allocated for device to device communication.

5. The method of claim 1, wherein the updated session context record is sent by the control plane device to the first user plane device when the second UE switches to the third user plane device without receiving a request from the first user plane device requesting the updated session context record.

6. The method of claim 1, wherein the first data packet is a data packet of a vehicle-to-vehicle service.

7. The method of claim 1, wherein the first user plane device is a first user plane gateway and the second user plane device is a second user plane gateway.

8. The method of claim 7, wherein the third user plane device is a third user plane gateway.

9. The method of claim 7, wherein the control plane device manages the first user plane device and the second user plane device.

10. A system, comprising:

a first user plane device;
a second user plane device;
a third user plane device; and
a control plane device;

wherein the first user plane device is configured to:
receive a first data packet to be sent to a second user equipment (UE) from a first UE, the first data packet including first data and an Internet Protocol (IP) address of the second UE;

obtain an identifier of the second user plane device which is associated with the IP address of the second UE from a context record, wherein the second user plane device serves the second UE, and the context record is stored by the first user plane device before the first data packet is received;

send the first data packet to the second user plane device according to the identifier of the second user plane device;

wherein the second user plane device is configured to send the first data packet to the second UE; and wherein the first user plane device is further configured to:
receive an updated session context record from the control plane device when the second UE has switched to the third user plane device that serves the second UE after the switch;

update the identifier of the second user plane device associated with the IP address of the second UE in the context record with an identifier of the third user plane device according to the updated session context record;

receive a second data packet to be sent to the second UE from the first UE, wherein the second data packet includes the IP address of the second UE, and the IP address of the second UE remains unchanged when the second UE switches from the second user plane device to the third user plane device; and send the second data packet to the third user plane device according to the identifier of the third user plane device included in the context record.

11. The system of claim 10, wherein the control plane device is configured to, when the second UE switches to the third user plane device, obtain a critical distance, and for each user plane device in a set of one or more user plane devices of the system, perform the following:

when a distance from the respective user plane device to the second UE is less than the critical distance, and when a context record has been stored in the respective user plane device, update the context record stored in the respective user plane device, to form an updated context record stored in the respective user plane device, wherein the updated context record for the second UE stored in the respective user plane device includes the IP address of the second UE and the identifier of the third user plane device; and when a distance from the respective user plane device to the second UE is less than the critical distance, and when no context record has been stored in the respective user plane device, create a context record in the respective user plane device, wherein the created context record includes the IP address of the second UE and the identifier of the third user plane device.

12. The system of claim 10, wherein the IP address of the second UE and the IP address of the first UE are each allocated from an address pool resource, and addresses of the address pool resource are allocated for device to device communication.

13. The system of claim 10, wherein the first user plane device is a first user plane gateway and the second user plane device is a second user plane gateway.

14. The system of claim 13, wherein the third user plane device is a third user plane gateway.

15. The system of claim 13, wherein the control plane device manages the first user plane device and the second user plane device.

16. A gateway, comprising:
a receiver, configured to receive a first data packet to be sent to a second user equipment (UE) from a first user equipment (UE), the first data packet including first data and an IP address of the second UE;
a processor;
a non-transitory memory storing instructions, wherein the processor is configured to execute the instructions to:
obtain an identifier of a second gateway associated with the IP address of the second UE from a context record, wherein the second gateway serves the second UE, and wherein the context record is stored by the gateway before the first data packet is received; and
a transmitter, configured to send the first data packet to the second gateway according to the identifier of the second gateway, wherein sending the first data packet to the second gateway causes the second gateway to send the first data packet to the second UE; and
wherein the processor is configured to further execute the instructions to:
receive an updated session context record from a control plane device when the second UE has switched to a third gateway that serves the second UE;
update the identifier of the gateway associated with the IP address of the second UE in the context record with an identifier of the third gateway according to the updated session context record;
receive a second data packet to be sent to the second UE from the first UE, wherein the second data packet includes the IP address of the second UE, and the IP address of the second UE remains unchanged when the second UE switches from the second gateway to the third gateway; and
wherein the transmitter is further configured to:
send the second data packet to the third gateway according to the identifier of the third gateway included in the updated context record.

17. The gateway of claim 16, wherein the IP address of the second UE and an IP address of the first UE are each allocated from an address pool resource, and addresses of the address pool resource are allocated for device to device communication.

* * * * *